United States Patent
Lu

(10) Patent No.: US 9,687,856 B2
(45) Date of Patent: Jun. 27, 2017

(54) SHREDDING CUTTER AND MACHINING METHOD THEREOF

(71) Applicant: DONGGUAN ELITE ELECTRIC HARDWARE PRODUCT CO., LTD., Dongguan (CN)

(72) Inventor: Xuezhong Lu, Chongqing (CN)

(73) Assignee: DONGGUAN ELITE ELECTRIC HARDWARE PRODUCT CO., LTD., Dongguan (CN)

( * ) Notice: Subject to any disclaimer, the term of this patent is extended or adjusted under 35 U.S.C. 154(b) by 191 days.

(21) Appl. No.: 14/697,426

(22) Filed: Apr. 27, 2015

(65) Prior Publication Data

US 2016/0310954 A1   Oct. 27, 2016

Related U.S. Application Data

(63) Continuation-in-part of application No. 13/380,706, filed as application No. PCT/CN2009/073686 on Sep. 2, 2009.

(30) Foreign Application Priority Data

Jul. 1, 2009 (CN) .......................... 2009 1 0040722

(51) Int. Cl.
  *B23P 15/28* (2006.01)
  *B02C 18/18* (2006.01)
  *B02C 18/00* (2006.01)
  *B02C 18/14* (2006.01)

(52) U.S. Cl.
  CPC ........ *B02C 18/182* (2013.01); *B02C 18/0007* (2013.01); *B02C 18/14* (2013.01); *B23P 15/28* (2013.01)

(58) Field of Classification Search
  CPC ... B02C 18/182; B02C 18/14; B02C 18/0007; B23P 15/28
  USPC .................................................. 241/236, 295
  See application file for complete search history.

(56) References Cited

U.S. PATENT DOCUMENTS 6,260,780 B1 *  7/2001  Kroger .................. B02C 18/182
                                                           241/236

* cited by examiner

*Primary Examiner* — Mark Rosenbaum
(74) *Attorney, Agent, or Firm* — Shimokaji IP

(57) ABSTRACT

A machining method of a shredding cutter includes providing a cutter shaft and a plurality of blades; arranging the plurality of blades on the cutter shaft in a predetermined spacing; and rolling or extruding intervals of the cutter shaft between the blades to shift some materials thereof from middle toward both sides and squeeze the materials onto flanks of the blades to form embossed parts so that the blades are embedded in the embossed parts and clamped by the embossed parts, thereby fixing the blades onto the cutter shaft. The shredding cutter has a strong unitary structure, high precision, high yield, which is beneficial to reduce the processing cost and the cost of materials.

3 Claims, 5 Drawing Sheets

SHREDDING CUTTER AND MACHINING METHOD THEREOF

RELATED APPLICATIONS

This is a Continuation-in-Part of U.S. patent application Ser. No. 13/380,706, filed Sep. 2, 2009.

FIELD OF THE INVENTION

The present invention relates to a cutter for a shredder and a machining method thereof.

BACKGROUND OF THE INVENTION

Commonly, a conventional shredding cutter and its machining process include three types as following.

First, a fixed way with spacing rings. As shown in FIGS. 1(a)-1(c), the cutter includes a cutter shaft 11, blades 12, spring retainers and spacing rings 14, wherein each blade 12 is fixed on the cutter shaft 11 between the adjacent spacing rings 14, and the cutter shaft 11 are fixed by two spring retainers retaining the cutter shaft 11 at opposite ends respectively. The advantages of this machining method of the cutter are that the process is simple and the operation is convenient. However, its disadvantages includes that (a) the cost of the total cutter is increased as the spacing rings are needed; (b) the assembly difficulty is increased since the spacing rings and the blades are superimposed each other, and both of them have thickness tolerances, the small tolerances are finally cumulated to cause the spring retainers may not be assembled; (c) the spacing rings are easy to get broken since it can only stand a limited force.

Second, a machining way with a ball bearing expansion hollow tube. As shown in FIGS. 2(a)-2(c), this cutter includes a cutter shaft 21 and a plurality of blades 22, wherein the cutter shaft 21 is a hollow steel tube. During the machining process, a ball bearing 23 (a steel ball) rolls in the cutter shaft 21, and the cutter shaft 21 is expanded as the diameter of the ball bearing 23 is slightly larger than the inner diameter of the cutter shaft 21, thereby the blades 22 are fixed on the cutter shaft 21. The advantages of this machining method of the cutter are that the cost is reduced as the spacing rings are needless, and the operation is convenient. However, its disadvantages include that (a) the cutter shaft can not stand a great torsion of the blades (compared to the polyhedral solid cutter shaft) since the cutter shaft is a hollow tube structure; (b) since the cutter shaft is a hollow tube structure as mentioned, thus the pressure it can stand is smaller than that of the solid cutter shaft. During the operation of the cutter shaft, the cutter shaft is easy to distort once a greater pressure is stood, which is only applicable to a small quantity of paper therefore.

Third, a unitary machining way. The machining way does a turning to a solid bar to form a unitary cutter. The advantages of this machining method of the cutter are that the structure is unitary with a reliable intensity. However, its disadvantages are that (a) requirements of the turning process are quite high, the turning quantity is large, and the yield is low; (b) numbers of mechanical processing equipments are needed in the mass production, the rate of the quality products is low, and the reparability is small.

SUMMARY OF THE INVENTION

Based on the drawbacks existing in the prior arts, one objective of the present invention is to provide an improved shredding cutter and a machining method thereof, which applies a way of rolling and extruding on the surface of the cutter shaft, to make the materials of the cutter shaft flow toward two sides of the extrusion position, so as to fix the blades onto the cutter shaft.

The present invention is realized by the following technical solution. A machining method of a shredding cutter includes steps of providing a cutter shaft and a plurality of blades; arranging the plurality of blades on the cutter shaft in a predetermined spacing; and rolling or extruding intervals of the cutter shaft between the blades to shift some materials thereof from middle toward both sides and squeeze the materials onto flanks of the blades to form embossed parts so that the blades are embedded in the embossed parts and clamped by the embossed parts, thereby fixing the blades onto the cutter shaft.

Preferably, the machining method further includes rolling or extruding the intervals of the cutter shaft between the blades by means of a rolling cutter.

The mentioned-above rolling cutter includes a hob shelf, hobs, gaskets and spring retainers, the hobs are arranged on the hob shelf and spaced by the gaskets, and the hobs are fixed on the hob shelf by the spring retainers retaining the hobs at opposite ends. Spacing between the adjacent hobs on the hob shelf is larger than or equal to the thickness of the blade of the shredding cutter to be machined. In addition, at least one groove is formed on the cutter shaft between the adjacent blades.

Based on the machining method of a shredding cutter mentioned above, a shredding cutter of the present invention includes a cutter shaft and a plurality of blades arranged on the cutter shaft in a predetermined spacing. Intervals of the cutter shaft between the blades are rolled or extruded so that some materials thereof are shifted from middle toward both sides and squeezed onto flanks of the blades to form embossed parts, the blades are embedded in the embossed parts and clamped by the embossed parts, whereby the blades are fixed onto the cutter shaft.

The embossed parts on the cutter shaft are formed by rolling or extruding by a rolling cutter. The rolling cutter includes a hob shelf, hobs, gaskets and spring retainers, the hobs are arranged on the hob shelf with spaced by the gaskets, and the hobs are fixed on the hob shelf by the spring retainers retaining the hobs at opposite ends. Spacing between the adjacent hobs on the hob shelf is larger than or equal to the thickness of the blade of the shredding cutter to be machined. At least one groove is formed on the cutter shaft between the adjacent blades.

The mentioned-above cutter shaft is a solid polyhedron or a cylindrical cutter shaft having grooves on the surface thereof.

Because the intervals of the cutter shaft between the blades are rolled or extruded so that some materials thereof are shifted from middle toward both sides and squeezed onto flanks of the blades to form embossed parts, and the blades are embedded in the embossed parts and clamped by the embossed parts, thus the blades are fixed onto the cutter shaft, without additional clamping means. Therefore, the present invention has the following advantages: (a) the unitary structure is strong similarly to the cutter formed by the unitary machining way; (b) no spacing rings are needed for fixing the blades, which improves the assembly precision and eliminates the cumulative tolerances generated during the assembly; and (c) no turning quantity is generated during the assembly, and the yield is increased, which reduces the processing cost and the cost of materials.

BRIEF DESCRIPTION OF THE DRAWINGS

FIGS. 1(a)-2(c) are machining process views of a conventional cutter by using a machining way with a ball bearing expansion hollow tube;

DETAILED DESCRIPTION OF ILLUSTRATED EMBODIMENTS

A further description of the specific structure of the present invention combining with accompanying drawings follows.

Figure 1A:
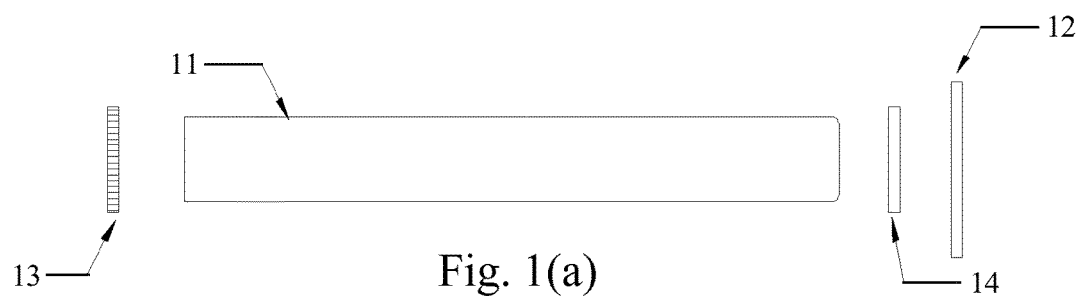
FIGS. 1(a)-1(c) are machining process views of a conventional cutter by using a fixed way with spacing rings.
Figure 1B:
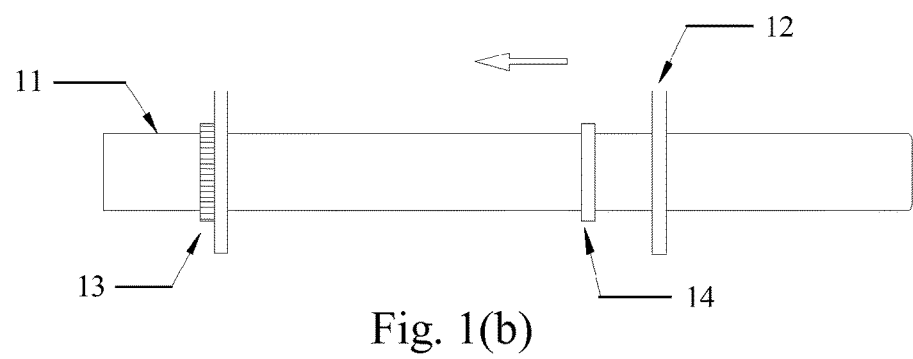
Figure 1C:
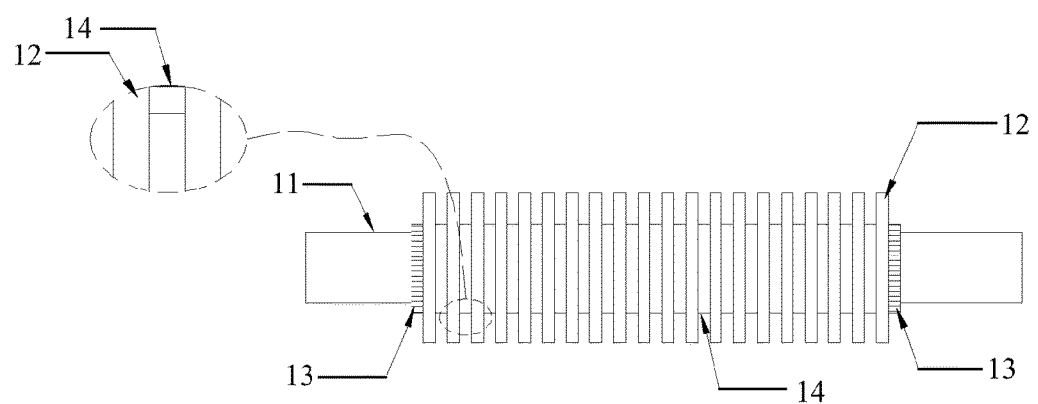
Figure 2A:
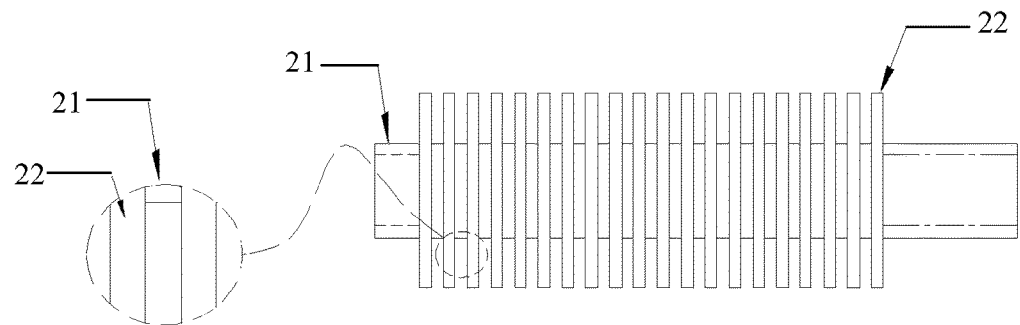
Figure 2B:
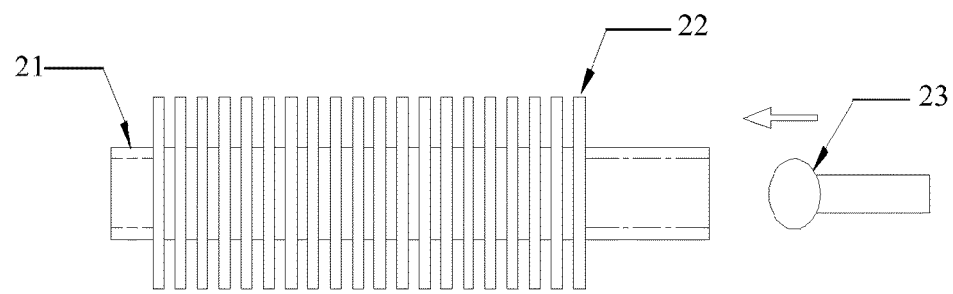
Figure 2C:
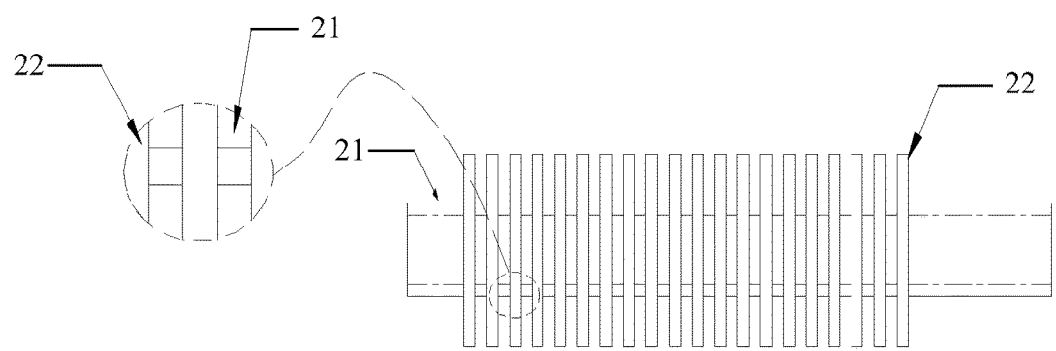
Figure 3A:
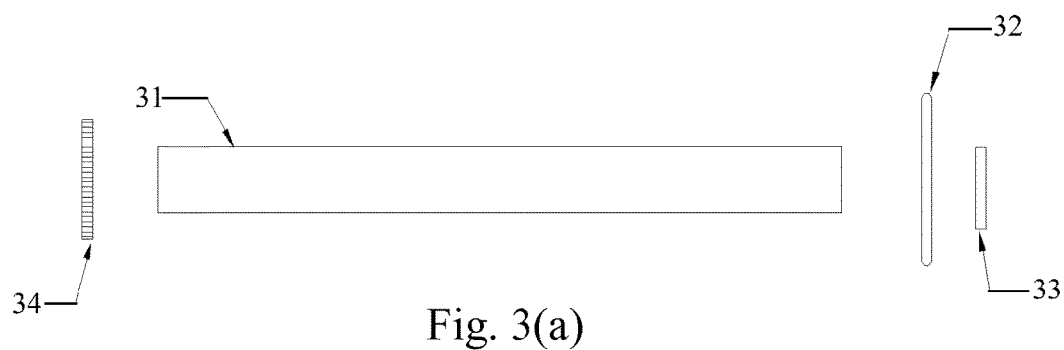
FIGS. 3(a)-3(c) are assembly structure views of a rolling cutter of the present invention.
Figure 3B:
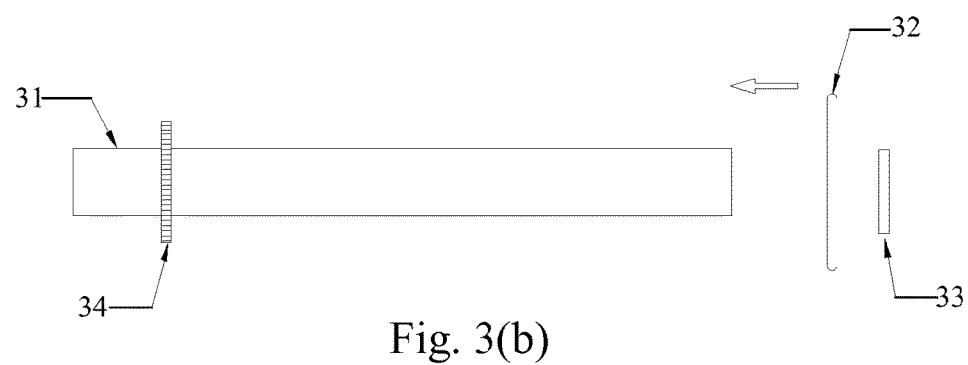
Figure 3C:
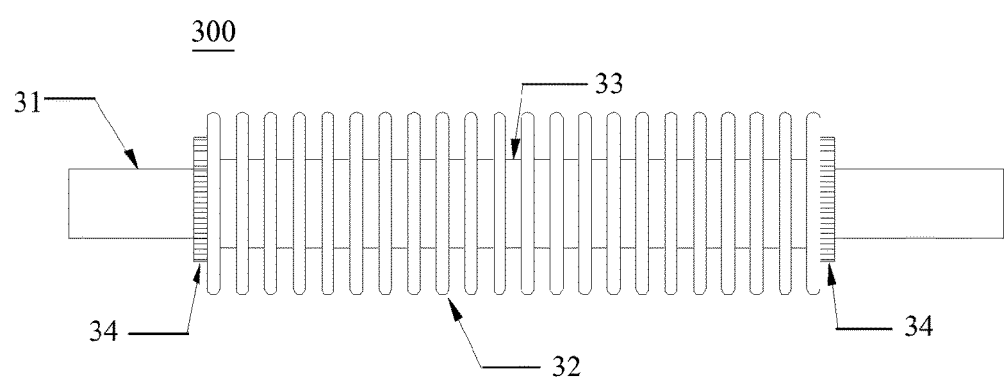

Referring to FIGS. 3(a)-3(c), a rolling cutter which is a machining cutter used during the machining process of the shredding cutter of the present invention is shown. The rolling cutter 300 includes a hob shelf 31, a plurality of hobs 32, gaskets 33 and two spring retainers, and the hobs 32 are arranged on the hob shelf 31 and spaced by the gaskets 33, and the hobs 32 are fixed on the hob shelf 31 by the spring retainers 34 retaining the hobs at opposite ends.

Figure 4A:
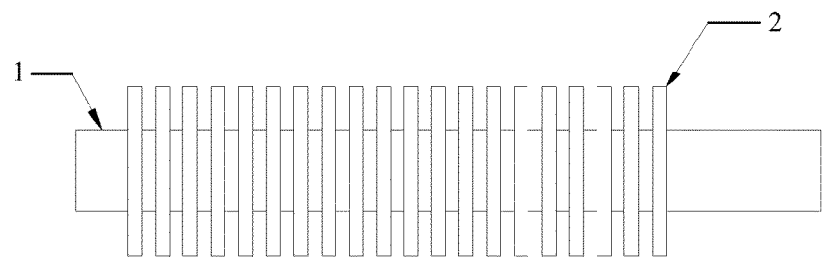
FIGS. 4(a)-4(c) are machining process views and structure views of a shredding cutter of the present invention.
Figure 4B:
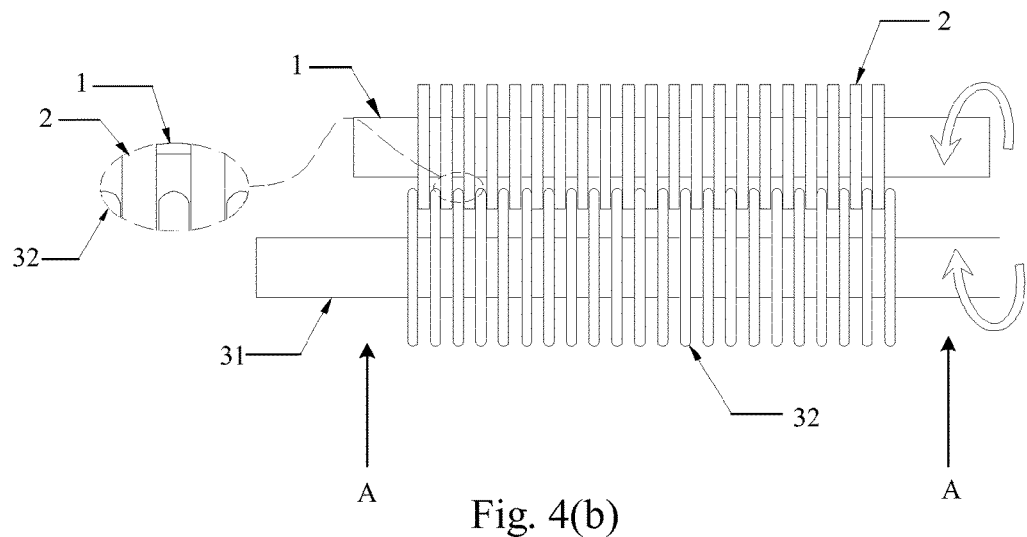
Figure 4C:
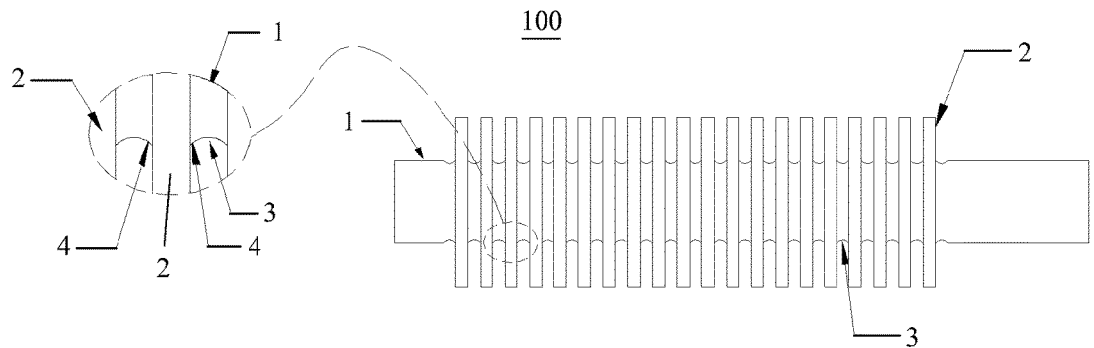

As shown in FIGS. 4(a)-4(c), a machining method of a shredding cutter of the present invention includes steps of:

(a) assembling blades 2 on a cutter shaft 1 to be machined, and pre-locating the blades 2 on the cutter shaft by a clamp (not shown in the figures);

(b) rolling or extruding the cutter shaft 1 at positions between the blades 2 by the hobs 32 of the rolling cutter along the direction A, so that the cutter shaft 1 between the adjacent blades 2 is formed with embossed parts 4 on two flanks of each blade 2, and a groove 3 is formed between the two embossed parts 4; and (c) withdrawing the rolling cutter 300, and each of the blades 2 being fixed on the cutter shaft 1 by the embossed parts 4 on the two flanks thereof.

Figure 4D:
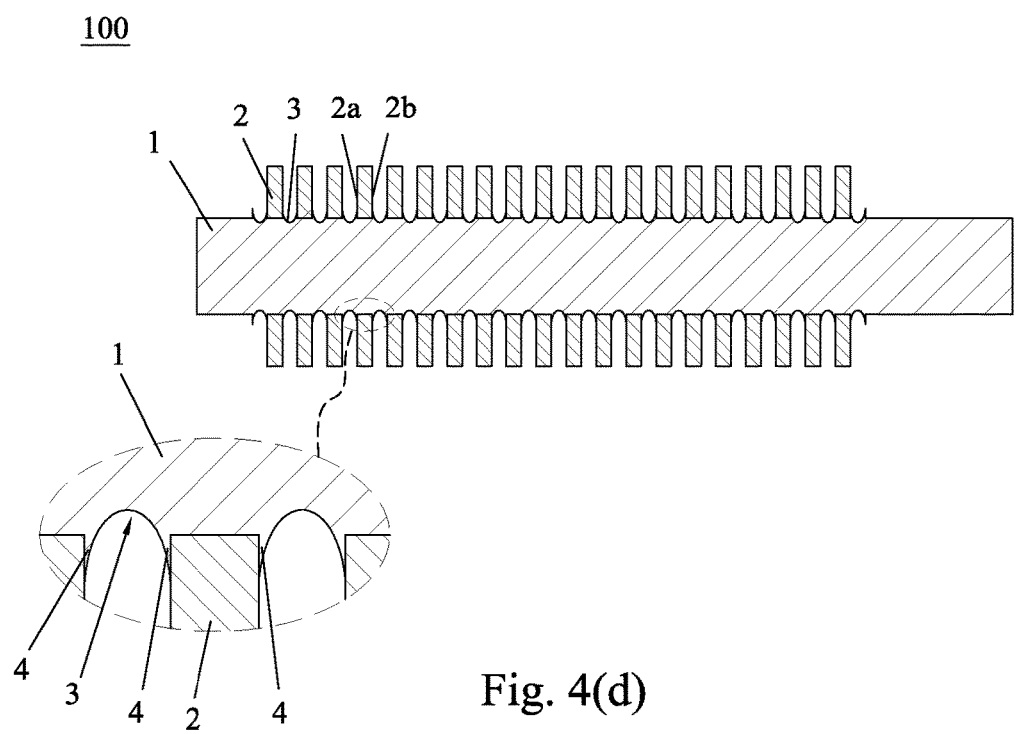
FIG. 4(d) is a cross-sectional view of the shredding cutter of FIG. 4(c).

Specifically, the embossed parts 4 in the step (b) are formed as following: rolling or extruding the intervals of the cutter shaft 1 between the blades 2 by the hobs 32 of the rolling cutter 300 along the direction A, to shift some materials of the cutter shaft 1 from the middle toward both sides and squeeze the materials onto flanks 2a, 2b of the blades 2 to form embossed parts 4 and grooves 3 between two embossed parts 4, so that the blades 2 are embedded in and clamped by the embossed parts 4, as shown in FIGS. 4(c) and 4(d). And more specifically, the periphery of the center hole of each blade 2 is clamped by the embossed parts 4.

In the step (c), after the rolling cutter 300 is withdrawn, each of the blades 2 is fixed onto the cutter shaft 1 by the embossed parts 4 on the two flanks 2a, 2b thereof, without any additional clamping elements such as the spacing rings in the prior art.

For ensuring the machining process can be carried out successfully, the spacing between the adjacent hobs 32 on the hob shelf 1 is larger than or equal to the thickness of the blade 2 of the shredding cutter to be machined.

In comparison with the prior art, because the intervals of the cutter shaft 1 between the blades 2 are rolled or extruded so that some materials of the cutter shaft 1 are shifted from middle toward both sides and squeezed onto the flanks 2a, 2b of the blades 2 to form the embossed parts 4, and the blades 2 are embedded in the embossed parts 4 and clamped by the embossed parts 4, thus the blades 2 are fixed onto the cutter shaft 1, without additional clamping means. As such, the unitary structure of the shredding cutter is strong similarly to the cutter formed by the unitary machining way, and there is no spacing ring needed for fixing the blades, which improves the assembly precision and eliminates the cumulative tolerances generated during the assembly. Furthermore, there is no turning quantity generated during the assembly, and the yield is increased, which reduces the processing cost and the cost of materials.

The above embodiment describes an instance of rolling or extruding a groove 3 on the cutter shaft 1 between the adjacent blades 2. However, if the distance of the cutter shaft 1 between the adjacent blades 2 is relative large, the area needed to roll or extrude is larger accordingly, and in turn, the applied rolling force or extruding force is larger, which causes the machining process become relative difficult. For ensuring the machining process can be carried out successfully, the present invention can use a hob having two or more edges or use two or more hobs to roll or extrude the cutter shaft 1 between the adjacent blades 2, so that a plurality of grooves 3 will be formed on the cutter shaft 1 between every pair of blades 2, embossed parts 4 will be formed on two flanks of the blades 2, and the blades 2 are fixed on the cutter shaft 1 by the embossed parts 4 on the two flanks thereof. In a word, whatever formation of the groove 3 is, it's viable as long as embossed parts 4 are formed on the two flanks of the blades 2.

Referring to FIGS. 4(c) and 4(d) again, the shredding cutter 100 formed by the method mentioned above includes a cutter shaft 1 and a plurality of blades 2 arranged on the cutter shaft 1 in a predetermined spacing. Grooves 3 (formed by rolled or extruded by the rolling cutter mentioned above) are formed on the cutter shaft 1 between the adjacent blades 2, embossed parts 4 are formed on the two flanks of the blades 2, and the blades 2 are fixed between the embossed parts 4. Specifically, each blade 2 has a center hole (not shown) by which the blades 2 are arranged on the cutter shaft 1.

As best shown in FIG. 4(d), the intervals of the cutter shaft 1 between the blades 2 are rolled or extruded, so that some materials of the cutter shaft 1 are shifted from the middle toward both sides and squeezed onto flanks 2a, 2b of the blades 2 to form embossed parts 4, meanwhile the grooves 3 adjacent to the embossed parts 4 are formed. Specifically, the blades 2 are embedded in the embossed parts 4 and clamped by the embossed parts 4, and more specifically, the periphery of the center hole of the blade 2 is clamped by the embossed parts 4, so that the blade 2 is fixed onto the cutter shaft 1 without any additional clamping elements such as the spacing rings in the prior art.

Preferably, the cutter shaft 1 can be a solid polyhedron or a cylindrical cutter shaft having grooves on the surface thereof, so as to enhance the bearing force of the cutter shaft supporting for the torsion and pressure of the blades.

What is claimed is:

1. A machining method of a shredding cutter, comprising steps of:

providing a cutter shaft and a plurality of blades;

arranging the plurality of blades on the cutter shaft in a predetermined spacing; and rolling or extruding intervals of the cutter shaft between the blades to shift some materials thereof from middle toward both sides and squeeze the materials onto flanks of the blades to form embossed parts so that the blades are embedded in the embossed parts and clamped by the embossed parts, thereby fixing the blades onto the cutter shaft.

2. The machining method of a shredding cutter according to claim 1, further comprising rolling or extruding the intervals of the cutter shaft between the blades by means of a rolling cutter, wherein the rolling cutter comprises a hob shelf, hobs, gaskets and spring retainers, the hobs are arranged on the hob shelf and spaced by the gaskets, and the hobs are fixed on the hob shelf by the spring retainers retaining the hobs at opposite ends.

3. The machining method of a shredding cutter according to claim 2, wherein spacing between the adjacent hobs on the hob shelf is larger than or equal to the thickness of the blade.

\* \* \* \* \*